United States Patent [19]
Jarrett

[11] Patent Number: 5,576,082
[45] Date of Patent: Nov. 19, 1996

[54] WOOD TUBING

[75] Inventor: Mark G. Jarrett, St. Clair Shores, Mich.

[73] Assignee: Hollowood, Inc., Clinton Township, Mich.

[21] Appl. No.: 333,788

[22] Filed: Nov. 3, 1994

[51] Int. Cl.[6] .................. B32B 3/20; F16L 9/17
[52] U.S. Cl. .................. 428/36.91; 428/35.6; 428/57; 428/106; 428/114; 428/192; 138/141; 138/155; 138/156; 144/346
[58] Field of Search .................. 428/105, 106, 428/114, 35.6, 36.9, 36.91, 192, 57, 58; 138/141, 155, 156, 169; 144/346

[56] References Cited

U.S. PATENT DOCUMENTS

| | | | |
|---|---|---|---|
| 1,921,164 | 8/1933 | Lewis | 428/106 |
| 2,207,939 | 7/1940 | Nordby | 428/106 |
| 2,540,482 | 2/1951 | Henrey | 138/141 |
| 3,956,542 | 5/1976 | Roberti | 428/114 |
| 3,970,497 | 7/1976 | Glover et al. | 428/106 |
| 4,569,873 | 2/1986 | Robbins | 428/106 |
| 5,277,953 | 1/1994 | Tsuda | 428/114 |

*Primary Examiner*—Ellis Robinson
*Assistant Examiner*—Rena L. Dye
*Attorney, Agent, or Firm*—Gifford, Krass, Groh, Sprinkle, Patmore, Anderson & Citkowski, P.C.

[57] ABSTRACT

A wooden tube made up of tubular layers of wood veneer and the method of making it in which the various tubular layers are made from flat sheets of wood veneer having the grain in one layer extending longitudinally and the grain in an adjacent layer extending circumferentially of the tube so that the grain in adjacent layers extend transversely of each other with all joints extending in the direction of the wood grain being edge to edge butt joints and all joints extending transversely to the wood grain being interlocking finger joints and with adjoining tubular layers being bonded to each other to form a unitary tube.

11 Claims, 2 Drawing Sheets

WOOD TUBING

BACKGROUND OF THE INVENTION

1. Field of the Invention

This invention relates to wooden tubes fabricated from thin strips of wood veneer and to the method of making such tubes.

2. Description of the Prior Art

Wooden tubes if properly made have a wide variety of applications in various industries. For example, in the boating industry, tubular members can be used for masts and spars. In the building industry wooden tubes can be used for ornamental columns, stair spindles and banisters and in the air craft industry, as structural members for ultra-light aircraft. Tubes with an attractive wood grain also are sought for constructing furniture and accessories. Such wooden tubular members aside from offering an attractive wood grain also are highly desirable because of the high strength to weight ratio when compared with tubes made with resins or aluminum.

The prior art refers to wooden tubes in which the wood veneer is wound in a roll as a continuous sheet to form multiple layers on a mandrel or a continuous band spirally wound. Both forms of construction results in overlaps of the layers of thin wood which are clearly apparent in the finished product. Attempts to remove such overlaps by sanding is not practical because it destroys the appearance and strength of the tubing.

Although wooden tubes are referred to in the prior art, commercially available wooden tubes are very limited in both diameter and length and are not available in smaller diameters less than 5 inches or in lengths in excess of 2 feet.

SUMMARY OF THE INVENTION

It is an object of the invention to provide wooden tubes made of layers or laminations of wood veneer which can be made in long lengths and small diameters.

It is another object of the invention to provide such wooden tubes in which the grain of the woods in the various layers are arranged transversely of each other for maximum strength.

Still another object of the invention is to provide a wooden tube in which overlapped joints are eliminated resulting in a tube having uniform wall thickness.

Another object of the invention is to provide a method of making such laminated tubing.

The wooden tube contemplated by the present invention comprises a tube made of separate layers of wood veneer in which one layer has the wood grain extending longitudinally and in which the adjacent layer has its grain extending circumferentially of the tube. Such layers are bonded together so that the grain in adjacent layers are at right angles to each other for maximum strength. A typical tube would incorporate at least two layers and more typically four or more layers with the exterior layer having its grain extending longitudinally of the tube.

Depending on the tube diameter, the layers of wood veneer in which the grain extends longitudinally of the tube are made of a single piece of veneer with the opposite edges of the piece of veneer abutting each other to form a single layer butt joint extending generally parallel with the grain of the wood and the axis of the tube. Separate layers in which the grain extends circumferentially are typically formed of multiple pieces of veneer positioned in abutting single layered relationship to each other with adjoining edges of the pieces forming single layer butt joints extending circumferentially of the tube. The longitudinally extending edges of layers with circumferential grain are formed with finger joints to form a single layer joint extending transversely to the wood grain. Butt joints extending parallel to the wood grain are no weaker than the wood grain itself and extend in the same direction as the wood grain. Finger joints extending transversely to the wood grain minimize the weakening of the joint extended transversely to the wood grain.

The method by which the wood tube is made comprises forming each of the layers of the tube on a flat surface with the layers that are to have their grain extended longitudinally of the finished tube having a length equal to the tube to be formed and a width equal to the circumference to that particular tubular layer of veneer. The tubular layers h having their grain extending circumferencially of the tube to be formed are made up of pieces of veneer joined to each other in abutting relationship with the resultant butt joints extending parallel to the grain of the veneer. Sufficient pieces of veneer are joined together to form a layer having a length equal to that of the tube to be formed and with opposed edges forming complementary finger joints extending longitudinally of the layer and transversely to the grain and the butt joints of that layer. The layers of veneer with longitudinal grain and with cross grain are arranged with the outermost layer on the bottom, followed by a layer of glue in sheet form which in turn is followed by a layer of veneer with cross grain. The layers of veneer and glue are arranged in overlapping relationship to each other and are moved tangentially to be wrapped on a tubular mandrel defining the internal diameter of the tube and are wrapped on the mandrel so that the various layers of the veneer and glue are formed successively and as separate layers. After the desired number of layers of veneer and glue are formed on the mandrel a wrapping of paper or the like is rolled over the outer layer of veneer to hold the various layers in their assembled condition on the mandrel. The entire mandrel with the subassembly of layers veneer and glue are then allowed to cure or in the case of thermosetting glue, are subjected to heat and pressure to set the adhesive and bond the various layers of veneer to each other. Thereafter the paper wrapper can be removed to place the wooden tube in condition for use.

DETAILED DESCRIPTION OF THE PREFERRED EMBODIMENTS

Figure 1:
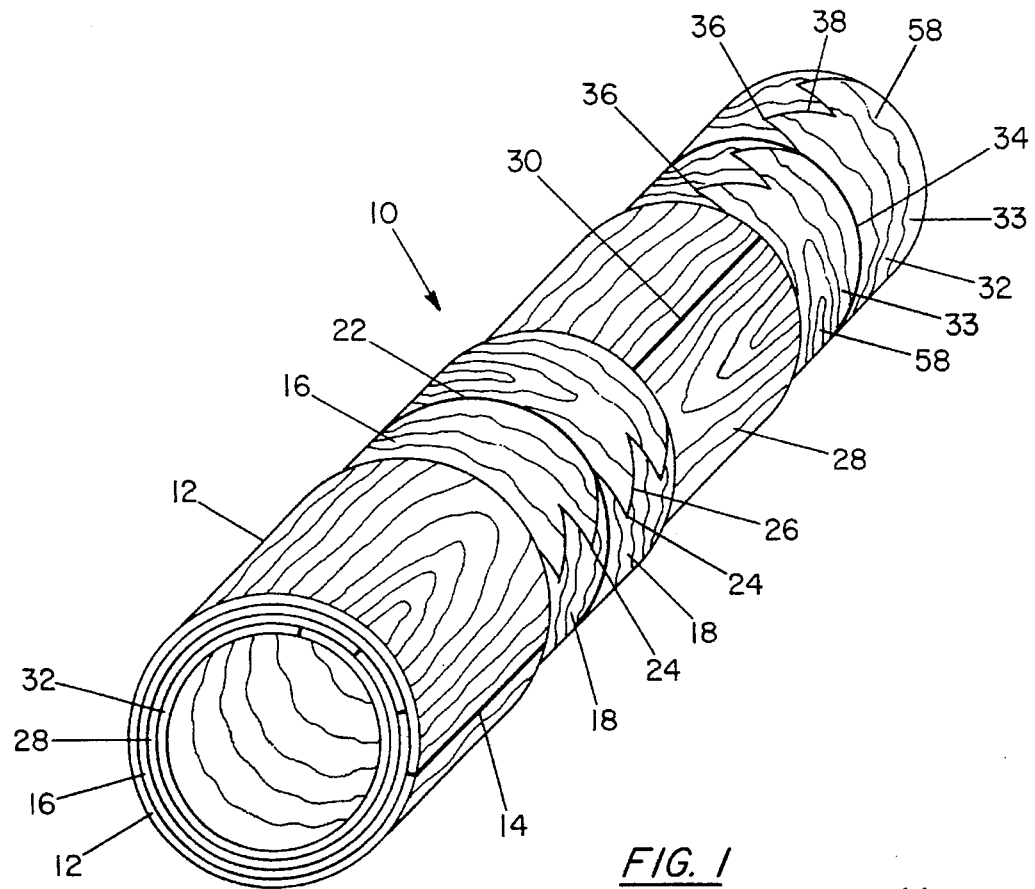
FIG. 1 is a perspective view of the wooden tube embodying the invention with layers of veneer broken away and removed.
Figure 2:
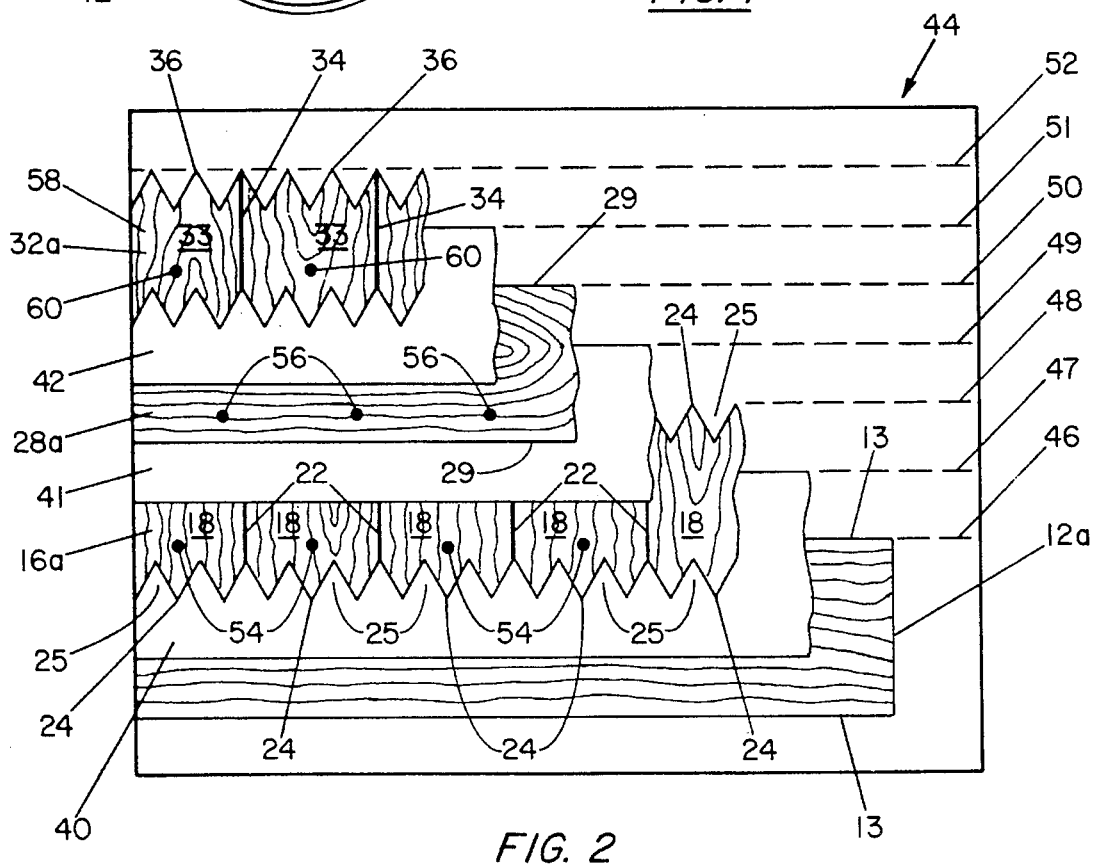
FIG. 2 is a plan view of a work station in which the various layers of material forming the wooden tube are arranged prior to bending into tubular form.
Figure 3:
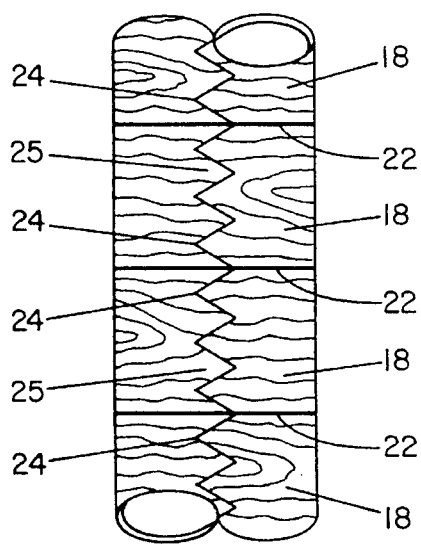
FIG. 3 is a plan view of a portion of one of the layers in the tube.

The wooden tube of the present invention is designated generally at 10 and is made up of separate tubular layers or laminations of wood veneer. Adjacent layers of veneer are disposed so that the direction of the wood grain in adjoining layers extends at right angles to each other in much the same manner as in flat sheets of plywood. Flat sheets of plywood typically are made of an odd number of layers of wood veneer so that the face and back of a plywood sheet have their grain extending in the same direction. Unlike such plywood sheets the tube of the present invention can be made of either an odd number or even number of tubular layers with the outer or face layer usually having the wood grain extending longitudinally of the tube.

A tube 10 would include at least two tubular layers but could include many more layers. For the purpose of explanation, a tube made up of four tubular layers will be described.

The tube 10 includes an outer tubular layer 12 in which the grain extends longitudinally of the tube. The layer 12 is formed from a flat sheet 12a of veneer, seen in FIG. 5, having a length equal to the length of the tube to be made. A readily available length of wood veneer is ninety-nine inches in the direction of the wood grain although lengths of up to fifteen feet are commercially available. Typically, wooden tubes could be made in eight foot lengths. For this purpose, the width of a flat sheet 12a forming the tubular layer 12 is equal to the circumference of the tubular layer 12. When the flat sheet 12a is formed into the tubular layer 12, opposite edges 13 of the single piece of wood veneer are in edge to edge abutment with each other to form a single layer butt joint 14 extending the full length of the tube 10 and in the direction of the wood grain.

The next layer adjacent m the tubular layer 12 is a cross-band layer 16 having its grain in the finished tube 10 extending circumferentially of the tube and at right angles to the direction of the grain in the face layer 12. The tubular cross-band layer 16 is formed from a sheet 16a made up of multiple pieces of veneer 18. The wood grain in the sheet or flat layer 16a extends transversely to the elongated sheet forming the tubular layer 16 and multiple pieces of veneer are used making it possible to use cheaper veneers having widths less than 97 inches and also scrap pieces of veneer. The multiple pieces of veneer, two of which are indicated at 18 in FIG. 1 are in abutment with each other to form a single layer, circumferentially extending butt joint 22 generally parallel to the direction of the wood grain. The opposite edges of the flat layer or sheet 16a forming the tubular layer 16 are formed with complementary fingers 24 extending in the direction of the wood grain which when joined together, fit in spaces 25 between adjacent fingers 24 at the opposite edge to form a finger joint 26 as seen in FIG. 1. Finger joint 26 is in a single layer without any overlap and makes it possible to form a strong joint extending transversely of the wood grain.

Disposed within the tubular layer 16 is a core layer 28 having its grain extending longitudinally of the tube in the same direction as the grain in the face layer 12. The core layer 28 is formed into a tube from a flat sheet 28a having a width equal to the circumference of the tubular layer 28. Typically the core layer 28 could be made of slightly thicker veneer than the remaining layers and could be of a more economical variety of wood. Opposite edges 29 of the sheet 28a are abutted against each other to form a single layer butt joint 30 extending the full length of the tubular layer 28.

The final layer of wood veneer in a four layered tube is a cross-band tubular layer 32 having its grain extending circumferentially. Adjoining pieces of veneer 33 similar to pieces 18 in layer 16 are disposed in adjacent abutting relationship to form single layer butt joints 34 extending circumferentially of the layer 32. Opposite edges of the sheet 32a forming the tubular layer 32 are formed with circumferentially extending fingers 36 which fit in the spaces 33 between adjacent fingers in the opposite edge. The fingers 36 are complementary to each other to form a finger joint 38 when formed into the tubular layer 32 disposed between adjacent pairs of tubular layers 12 and 16, 16 and 28 and 28 and 32 are bonding agents or adhesive. Wet, cold setting adhesives can be used but in the preferred embodiment of the invention thermosetting sheet adhesive is used. Such sheet adhesive is readily available in various grades with waterproof or water resistant properties. Moreover, such thermosetting sheet adhesive makes it possible to keep waste to a minimum and is more environmentally friendly than most wet adhesives or glues.

When an assembly is made up of the tubular layers 12, 16, 28 and 32 as well as the three sheets 40, 41 and 42 of thermosetting sheet adhesive and is subjected to heat and pressure, the various layers of wood veneer are bonded together to form a strong, multiple layered, wooden tube 10.

The method by which the wood tube 10 is made includes the prior preparation of flat sheets of veneer, arrangement of those sheets into a subassembly 43 which is fed to a tubular mandrel so that the sheets of veneer forming the various tubular layers are progressively wrapped on the mandrel.

Face layer 12a is formed by cutting a flat sheet of veneer to have a length substantially equal to the length of the tulle to be formed and a width equal to the circumference of the tubular layer 12. The veneer is selected so that the grain extends longitudinally of the sheet and of the finished tube 10. The sheet 12a is referred to as the face sheet and normally is positioned on a template 44 having parallel reference lines 46 through 52 for the purpose of locating the various sheets of veneer relative to each other. Face sheet 12a is placed with one of its edges 13 aligned to a first of the reference lines 46 with the choice side of the veneer sheet 12a facing downwardly on the work station or template since this face will be the visible side in the finished tube 10.

The next layer is a first sheet 40 of thermosetting glue having a length equal to the tube to be formed and a width slightly greater than the circumference of the finished layer of adhesive in the tube 10. For example, an overlap of about one sixteenth of an inch is found desirable to insure a layer of adhesive without any voids. The first sheet of thermosetting glue 42 is placed on top of the face layer 12a with one edge against the reference line 47 so that the sheet 42 of thermosetting glue overlaps the veneer sheet 12a.

The next layer is a cross-band sheet 16a made up of multiple pieces of veneer 18. The layer 16a can be formed from a long narrow strip of veneer by forming fingers 24 which are staggered relative to transversely dispose finger receiving spaces 25 at the opposite edge of the veneer piece 18.

Preferably the finger joints are made with relatively long fingers with the sloping sides diverging from each other at an angle of ninety degrees. It is possible to use other shapes such as sine shaped curves. However, the fingers should be relatively long and the straight edges of the saw tooth shape is easily cut with simple equipment and is used in the preferred embodiment of the invention.

The veneer pieces 18 are placed in side by side relationship on the sheet of thermosetting glue 40 with the ends of fingers 24 in alignment with the reference line 48. Each of the pieces 18 is partially and temporarily attached to the sheet 12a and the sheet 40 of thermosetting glue by applying heat at a localized area such as the spots 54 associated with each of the pieces 18. Such application of heat can be accomplished with a tool such as an electric soldering iron or the like. Such heat will cause the thermosetting glue to bond to both the pieces 18 and layer 12a. This causes the veneer pieces 18 to be held in position relative to each other and to be temporarily fixed to the face sheet 12a.

A sheet 41 of thermosetting adhesive 40 is next placed on the cross-band layer 16a with one edge against reference line 49 and with the opposite edge extending longitudinally of layer 16a an intermediate the opposite edges.

Next a core layer of veneer 28a is placed on the sheet of glue 41 with one edge 29 against reference line 50 and the opposite edge 29 spaced from a rearward edge of the glue sheet 41. Heat is applied to random localized points indicated at 56 which acts to hold the core sheet 28a in position relative to the layer 16a and also acts to maintain the pieces 18 of layer 28a in proper relationship to each other. At this point the core layer 28a, cross-band layer 16a and face sheet 12a are partially attached to each other.

The third sheet 42 of thermosetting resin in sheet form is placed on top of the core layer 28a with one edge against reference line 51 of the template 44 and with the opposite edge extending in spaced relationship to the opposite edge 29 of the core layer 28a.

The final layer of the subassembly making up a four layer tube 10 is made by arranging veneer pieces 58 similar to the veneer pieces 18 in layer 16a in side by side relationship on top of the glue sheet 40. The veneer pieces differ from pieces 18 in that the spacing between the finger 36 at one edge and the complementary recess at the opposite edge are slightly smaller than in the pieces 18 since the layer 32a will form the innermost tubular layer 32 of the tube 10. The pieces of veneer 58 making up the layer 32a are each heated at a localized location some of which are indicated at 60 to hold the pieces at side by side relationship and to attach them to the core layer 28a by melting the adhesive between the layer 32a and 28a.

Figure 6:
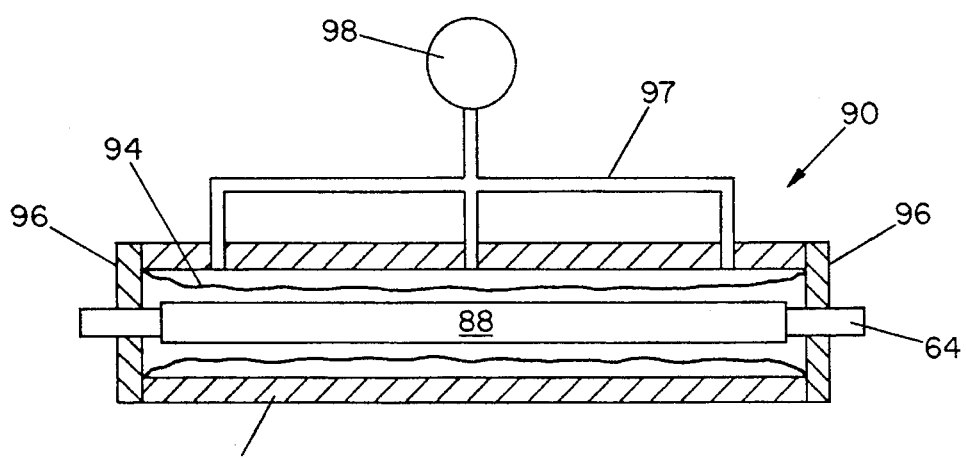
FIG. 6 is a diagrammatic view showing a clamping device in cross section.

In the form just described, the various layers or plies 12a, 16a, 28a and 32a are attached to each other so that they can be removed as a unit or subassembly 43 from the template 42 for bending on a mandrel 64 best seen in FIG. 6. The making of such a subassembly 43 makes it possible to preassemble a number of subassemblies 43 or to form subassemblies at a number of work stations separate from the work station with the mandrel 64.

Figure 4:
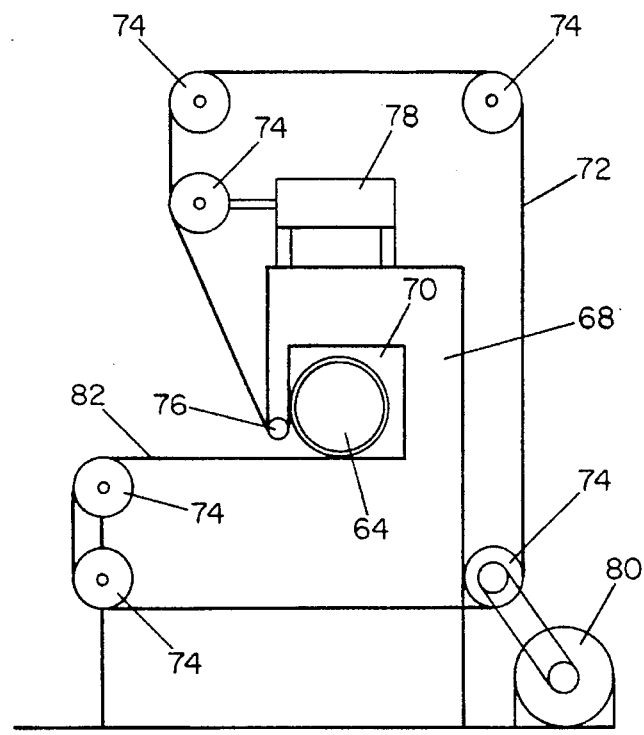
FIG. 4 is a diagrammatic view of apparatus for converting the flat sheets of material into tubular form.

The apparatus by which the tube 10 is formed includes the mandrel 64 in the form of a metal tube slightly longer than the tube 10 to be formed and with an outside diameter equal to the inside diameter of the tube 10. The apparatus 66 includes a mainframe 68 forming a mandrel receiving cavity 70. An endless web 72 having a width slightly longer than the tube 10 is guided into the mandrel receiving cavity 70, around the mandrel 64 and out of the cavity 70. The belt is further trained around a plurality of rollers 74 and a smaller roller 76 near the entrance to the mandrel receiving cavity 70. One of the rollers 74 is movably mounted so that a force can be applied by a fluid operated actuator 78 to apply a selected amount of force to the web 72 and therefore vary the pressure of the web 72 against the mandrel 64. The endless belt 72 is power driven by a motor 80 to move in a path around the mandrel 64 an rollers 74 and 76. The endless belt 72 forms a horizontal work surface 82 adjacent to the small roller 76 at the entrance to the mandrel receiving cavity 70. The apparatus 66 is placed in operation by positioning a mandrel 64 within the cavity 70 after which tension is applied to the belt 72 by the fluid motor 78 acting on its associated roller 74 so that movement of the belt 72 in a generally clockwise direction as viewed in FIG. 4 and to the right from the work station 82 causing the mandrel 64 to rotate in a counter clockwise direction.

Figure 5:
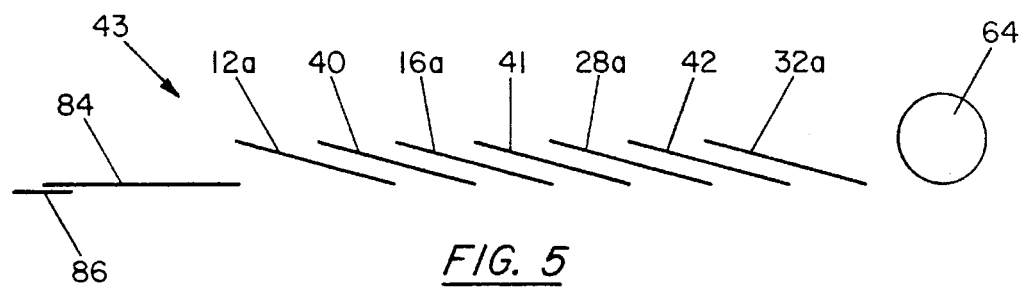
FIG. 5 is a diagrammatic view showing the relation of various layer of materials prior to forming a tube on a mandrel.

When a subassembly as shown in FIG. 5 is placed on the horizontal work surface 82 with the leading edge of the subassembly formed by the fingers 36 of the flat cross-band sheet 32a in parallel adjacent relationship to the opening to the mandrel and cavity 70, subsequent movement of the endless belt 72 causes the subassembly to be moved into the cavity 70 between the mandrel 64 and the endless belt 72. The subassembly is wrapped on the mandrel 64 so that successive layers of cross grain veneer 32a, adhesive sheet 42, core veneer 28a, adhesive sheet 41, cross grain veneer 16a, adhesive sheet 40 and face veneer 12a are each formed into a tubular layer in succession. This results in seven separate layers of material for a tube which is to have four layers of veneer. In such a tube, four of the layers are veneer and three of the layers are adhesive or glue and each layer is formed into a separate tube.

The use of the template 44 in forming the subassembly 62 insures that the various longitudinally extending joints such as butt joints 14 and 30 and finger joints 26 and 38 are spaced circumferentially from each other progressively in each layer to prevent alignment which might tend to weaken the tube.

Tube 10 has now been fully assembled and all that is required is the application of heat to activate the thermosetting glue so that it will bond to the adjacent layers or plies of veneer. This can be accomplished by the application of heat to the interior of the mandrel 64 while it is held in position on the mandrel 64 within the cavity 70. However, in actual practice and to speed the process of manufacture a sheet of wrapping paper 84 having a length equal to the length of the tube and a width of approximately one and one half times the circumference of the tube is fed from the horizontal work station 82 to be wrapped on the wooden tube assembly formed on the mandrel 64. The trailing edge of the wrapping paper 84 is provided with an adhesive tape 86 which has one edge attached to the trailing edge of the wrapping paper 84. A portion of the adhesive on the tape 86 remains exposed so that when the paper 84 is wrapped on the wood layers on the mandrel 64, the tape 86 attaches itself to the exterior of the wrapping paper at some intermediate point. Under these conditions pressure is relieved on the belt 72 by releasing pressure on the roller 74 associated with the actuator 78 This permits the removal of the mandrel 64 together with the tube assembly on the mandrel completely wrapped in the paper wrapping 84. If the adhesive used has been a liquid adhesive which requires time to set, the subassembly can be set to one side until such curing occurs. In the preferred embodiment, the use of thermosetting adhesive requires the application of heat to the entire subassembly to cause the thermosetting adhesive to melt and adhere to the adjoining layers of veneer. After the thermosetting adhesive is cooled, paper wrapping can be removed and the tube 10 is ready for any further operations that might be desirable such as trimming or light sanding.

Although the preferred method of making tube 10 utilizes thermosetting sheets of adhesive, the tube 10 also can be made with cold curing, wet adhesives of various types. In that case the characteristics of the finished wooden tube 10 remain the same except that the method of manufacture varies.

When wet glues are used, the cross-band layers 32a and 16a are prefabricated into single sheets by positioning the various pieces 18 and applying tape to the abutting edges to hold them in position relative to each other. The veneer layers 32a, 28a, 16a and 12a are fed to the forming mandrel 64 one at a time. For example, in the four layer tube, cross-band layer 32a is first formed into a tubular layer on mandrel 64. The next flat sheet or core veneer 28a has its top surface provided with a coating of wet glue and is fed to the mandrel 64. Similarly, the next layer formed by cross-band assembly 16a is provided with a film of wet glue on its top surface and is fed to the rotating mandrel where it is bent into a tubular layer 16. The final face layer 12a also is provided with a film of wet glue on its top surface and is fed to the rotating mandrel to be formed into the tubular layer 12 forming the face of the wooden tube 10.

As in the case of the tube using thermosetting sheet glue, the assembled layers of veneer are then wrapped in a coating of paper and the finished tubular assembly on the mandrel can be removed from the machine 66 to allow the adhesive to cure. Thereafter the wrapping can be removed and additional operations, if any, can be conducted.

Thermosetting glues usually are preferred over wet glues because the equipment used to form the tubes does not become easily contaminated by excess glue.

The utilization of thermosetting adhesive makes it desirable to apply pressure and heat to the assembled layers of wood veneer and sheets of thermosetting glue. For this purpose the mandrel 64 together with the assembled layers of adhesive and veneer and wrapping paper forming a subassembly 88 are placed in a curing fixture 90 best seen in FIG. 6. The fixture 90 is a large metal tubular housing 92 having a flexible, airtight bladder 94 disposed within the outer tube 92. For curing purposes the tube subassembly 88 and the mandrel 64 is placed within the tube 92 and the bladder 94. The ends of the tube 92 are sealed relative to the mandrel 64 and tube 92 by end caps 96 which also serve to seal the bladder relative to tube 92 so that an annular chamber is formed between tube 92 and bladder 94. Heat can be applied to the interior of the mandrel 64 by the use of electrical heating elements or a hot fluid medium such as water or steam. During the heating, air under pressure can be admitted through a manifold system 97 receiving compressed air from a source such as an air compressor 98. This causes the bladder 94 to be pressed against the subassembly 88 so that the melted thermosetting glue will bond uniformly to the adjacent surfaces of the layers of veneer and will migrate into the butt and finger joints. Typically, temperatures to the order of two hundred degrees and pressures to the order of two hundred fifty pounds per square inch are used. After the glue is melted, the heating of the mandrel 64 is terminated and the air pressure in the bladder 94 can be released. Thereafter the mandrel 64 with the tube assembly 88 can be removed from the interior from the bladder 94. The tube is now a bonded unit and the wrapper 84 can be removed and subsequent operation such as trimming and sanding conducted on the tube 10.

All of the butt joints, such as 14 and 30 extending longitudinally of the tube 10 and the butt joints 22 and 34 extending circumferentially of their respective layers in the tube all are disposed generally parallel to the grain of the wood in that particular layer. The finger joints 26 and 38 extend transversely of the direction of the grain in their respective layers. Such finger joints minimize weakening of the wood layer. If it becomes necessary in the manufacture of the wooden tube to use more than one piece of veneer to form a layer with longitudinally extending grain, pieces can be joined with a finger joint which extends circumferentially of that particular tubular layer of the tube.

Although a tube of four layers has been described, wooden tubes with more or less tubular layers can easily be made. The addition of layers simply requires the addition of properly sized or formed sheets of veneer and adhesive to bond such layers of veneer to the adjacent layers.

I claim:

1. A wood tube comprising:

multiple tubular layers of wood veneer with one tubular layer having wood grain extending longitudinally of said tube and an adjacent tubular layer having wood grain extending circumferentially of said tube, said one tubular layer of wood veneer having edges, said edges being in abutted relation to form a straight, single layer butt joint extending substantially in the direction of the wood grain, and said adjacent tubular layer of wood veneer having edges, said edges extending transversely to the direction of wood grain and forming a finger joint including fingers on each edge disposed between fingers on the opposite edge.

2. The wood tube of claim 1 wherein the distance between the end of any one finger on one edge and the recess between fingers on the opposite edge of said adjacent layer is substantially equal to the circumference of said adjacent layer.

3. The wood tube of claim 1 wherein the grain in the outermost layer of veneer extends longitudinally of said tube.

4. The wood tube of claim 1 wherein a layer of adhesive is disposed between adjacent layers of said tube.

5. The wood tube of claim 1 wherein said fingers extend in the direction of the wood grain.

6. The wood tube of claim 1 wherein each of said fingers have straight edges diverging from each other.

7. A wood tube comprising:

multiple tubular layers of wood veneer, each of a single thickness of veneer and with the grain in adjoining layers being disposed at substantially right angles to each other, a first tubular layer formed of a sheet of wood veneer with the grain extending longitudinally and the edges of the sheet forming said layer being in abutted relation to form a butt joint extending longitudinally of the tube, and a second tubular layer adjacent to said first layer formed of a sheet of wood veneer with the grain extending circumferentially and with the edges of adjoining pieces of veneer forming said second layer being in abutted relation to form butt joints extending circumferentially, said second layer having a finger joint extending transversely of the grain and longitudinally of said tube to form and interlocking joint of a single layer of veneer.

8. The wood tube of claim 7 and further comprising additional layers of veneer each of a single thickness and with the grain in adjacent layers transverse to each other.

9. The wood tube of claim 7 in which said layers are bonded together by thermosetting adhesive.

10. The wood tube of claim 7 wherein said interlocking joint is formed by a plurality of uniformly spaced fingers extending in the direction of the wood grain.

11. The wood tube of claim 10 wherein each of said fingers has side edges diverging from each other and complementary to the side edges of a recess between adjoining teeth on the opposite edge of said second layer.

* * * * *